United States Patent [19]

Gallup et al.

[11] Patent Number: 4,522,728
[45] Date of Patent: Jun. 11, 1985

[54] ACIDIFICTION OF STEAM CONDENSATE FOR INCOMPATIBILITY CONTROL DURING MIXING WITH GEOTHERMAL BRINE

[75] Inventors: Darrell L. Gallup, Ontario; John L. Featherstone, El Centro, both of Calif.

[73] Assignees: Union Oil Company of California, Los Angeles; Mono Power Company, Rosemead; Southern Pacific Land Company, San Francisco, all of Calif.

[21] Appl. No.: 567,254

[22] Filed: Dec. 30, 1983

[51] Int. Cl.³ .................................................. C02F 1/52
[52] U.S. Cl. .................................... 210/714; 210/718; 210/747; 210/790; 60/641.5
[58] Field of Search ............... 210/696, 718, 724, 737, 210/714, 747, 750, 774, 790; 60/641

[56] References Cited

U.S. PATENT DOCUMENTS

| | | | |
|---|---|---|---|
| 3,262,865 | 7/1966 | Waters | 203/7 |
| 3,627,479 | 12/1971 | Yee | 210/718 X |
| 3,775,312 | 11/1973 | Merchant | 210/51 |
| 3,862,545 | 1/1975 | Ellis et al. | 60/641 |
| 4,038,365 | 7/1977 | Patil et al. | 210/75 X |
| 4,148,360 | 4/1979 | Watanabe | 166/300 |
| 4,203,492 | 5/1980 | Watanabe | 166/300 |
| 4,259,300 | 3/1981 | Lieffers | 60/641 X |
| 4,370,858 | 2/1983 | Awerbuch et al. | 210/714 X |
| 4,405,463 | 9/1983 | Jost et al. | 210/747 X |
| 4,429,535 | 2/1984 | Featherstone | 210/714 X |

OTHER PUBLICATIONS

Featherstone et al., "Stabilization of Highly Saline Geothermal Brines", Soc. of Pet. Eng. AIME, No. SPE8269(1979).

Tardiff, "Using Salton Sea Geothermal Brines for Electrical Power", Lawrence Livermore Lab., Preprint No. UCRL-79468, 5/1977.

Kestin, "Sourcebook on the Production of Electricity from Geothermal Energy", Brown Univ., Publication No. DOE/RA/4051-1, 3/1980, Chap. 4, p. 536.

*Primary Examiner*—Thomas Wyse
*Attorney, Agent, or Firm*—Fowler, Lambert & Hackler

[57] ABSTRACT

A method is provided for combining a high pH steam condensate with a flow of an acidic geothermal brine from which the steam is extracted so as to inhibit the formation of suspended particulate matter by the chemical combining of impurities in the condensate and brine. The method includes acidifying the steam condensate, preferably by hydrochloric acid, to reduce the pH to between about 7 and about 5.5 and then permitting the acidified condensate to outgas such volatiles as hydrogen sulfide and carbon dioxide before combining the condensate with the brine, formation of such insolubles as heavy metal sulfides and calcium carbonate being thereby inhibited. In a silica crystallizer stage in which flashed brine is contacted with a silica seed material to cause silica removal from the brine, the treated condensate is combined with the brine in a low pressure crystallizer upstream of brine clarification and reinjection stages. Part of the treated condensate is flowed to various pumps in the geothermal brine power production system to purge pump seals and prevent pump scaling and excessive wear.

22 Claims, 2 Drawing Figures

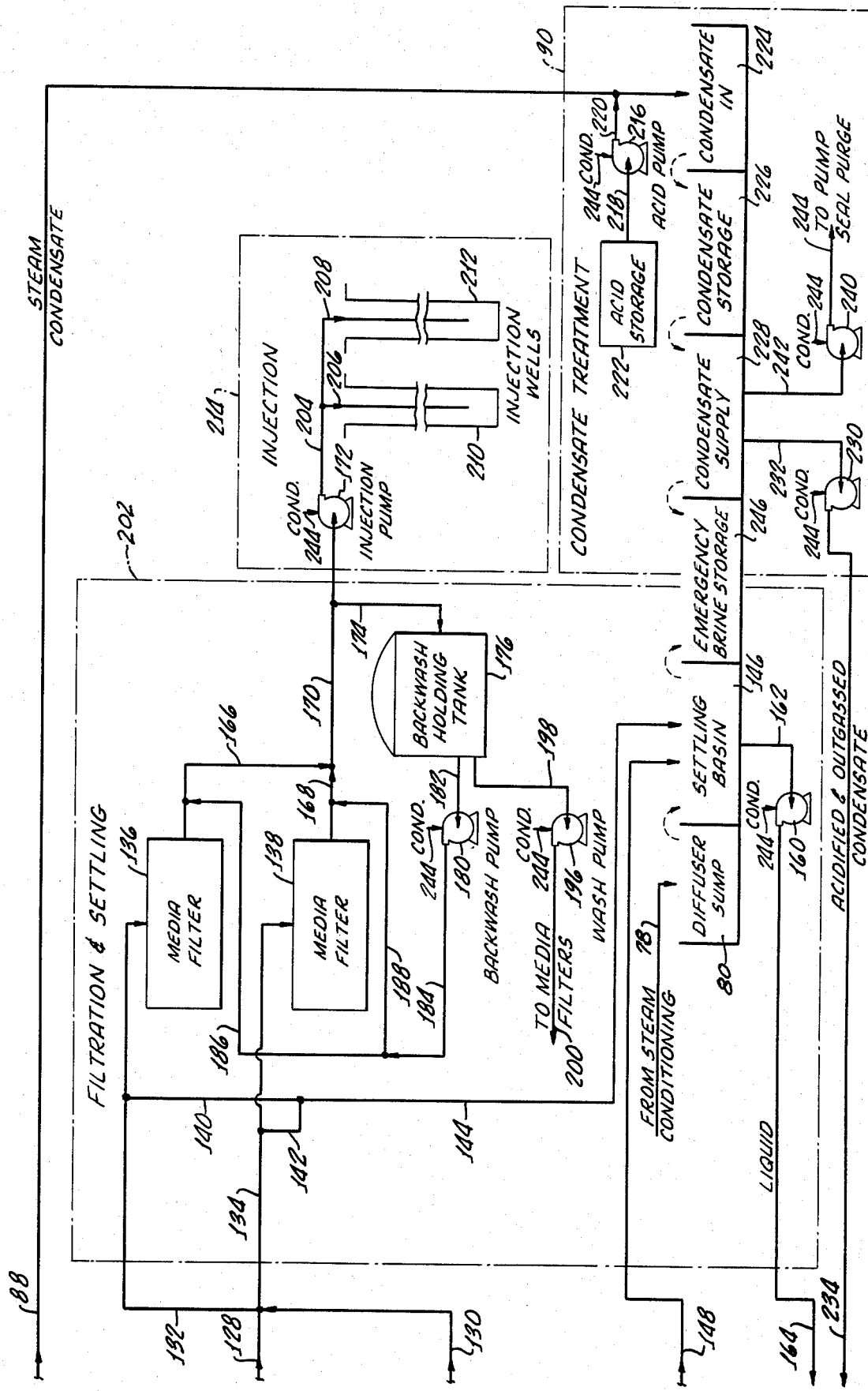

4,522,728

ACIDIFICTION OF STEAM CONDENSATE FOR INCOMPATIBILITY CONTROL DURING MIXING WITH GEOTHERMAL BRINE

BACKGROUND OF THE INVENTION

1. Field of the Invention

The present invention relates generally to processes for generating electrical power by use of hot geothermal aqueous liquids and more particularly to processes for controlling the formation of scale in geothermal brine power plants and associated brine injection equipment.

2. Discussion of the Prior Art

Large subterranean reservoirs of naturally occurring steam and/or hot aqueous liquids (water or brine) have been found in many regions of the world. Such geothermal reservoirs are especially prevalent where the thermal gradient near the earth's surface is abnormally high, as in regions of volcanic, geyser or fumarole activity, as is commonly found along the rim of the Pacific Ocean.

In some regions, where relatively abundant and readily accessible, hot geothermal fluids have, for some time, been used for therapeutic treatment of bodily disorders, in industrial processes, for heating purposes and the like. Although effort in further developing geothermal resources for such purposes continues, substantial effort has recently been directed towards using geothermal fluids to generate electric power which is usually mush less site-restricted than is the more direct use of geothermal fluids for the above mentioned purposes. These interests in geothermal resources for power generation have been heightened by recent steep increases in petroleum and natural gas costs, as well as by the actual or threatened shortages of such fuels.

The general processes for using hot geothermal fluids to generate electric power are quite well known. For example, geothermal steam can, after treatment to remove particulate material and polluting gases, be used in the manner of boiler-generated steam to drive conventional steam turbine-generators. Naturally pressurized, high temperature (above about 400° F.) geothermal water or brine is typically flashed to a reduced pressure to release steam which is used to drive steam turbine-generators. Lower temperature geothermal liquids are, in contrast, generally useful in binary fluid systems in which a low boiling point working fluid is vaporized by the hot geothermal liquid and the vapor is used to drive gas turbine-generators.

As can be appreciated, geothermal steam is preferred over geothermal liquids for the production of electric power because the steam can be used almost as extracted from the earth in generally conventional steam-turbine power plants. As a result, where abundantly available and favorably located, as at The Geysers in California, geothermal steam has been used for a number of years to generate substantial amounts of electric power at competitive costs. Unfortunately, however, abundant sources of geothermal steam are relatively scarce, and at current estimates are only about one-fifth as prevalent as good sources of geothermal aqueous liquids.

Because of the maturity of geothermal steam power generating processes and the scarcity of large geothermal steam sources, much of the current development effort in the geothermal field is directed towards developing commercially viable geothermal water/brine power generating facilities; particularly in such regions as the Imperial Valley in Southern California, where there is an abundance of geothermal brine.

General processes and techniques for using geothermal aqueous liquid to generate electric power are, as above-mentioned, known. Such processes and techniques are, in theory, relatively straight forward. However, in actual practice many serious problems are usually encountered in handling the geothermal aqueous liquids, particularly the brines. Geothermal aqueous liquids typically have wellhead temperatures of several hundred degrees Farenheit and pressures of several hundred p.s.i.g. and are typically heavily contaminated with dissolved materials. For example, in many regions, the geothermal aqueous liquids contain high levels of dissolved gases, such as hydrogen sulfide, carbon dioxide, and ammonia, as well as high levels of metals, such as, lead, iron, arsenic, and cadmium. In addition, many hot geothermal aqueous liquids are saturated with silica and many are also highly saline, in nature, being therefore termed brines.

Because of their high levels of contaminants and high wellhead temperatures, most geothermal aqueous liquids are not only corrosive to equipment and have scale forming characteristics, but the reduced-energy, geothermal effluent discharged from the power generating facility cannot be easily disposed of, particularly considering that flow rates in excess of one million pounds per hour are not uncommon. Effluent contaminants, such as lead and arsenic, preclude safe use of the discharged liquid for such otherwise potential uses as crop irrigation, and in most localities discharging of the effluent into rivers, lakes and other water supplies is prohibited. Ponding and evaporation of the discharged geothermal effluent is generally impractical because of the large volumes involved. Moreover, because of their typical heavy metal content, the evaporated residues are usually considered hazardous or toxic wastes and disposal is accordingly costly.

The most, and often the only, practical manner of disposing of the geothermal effluent is, therefore, by pumping it back into the ground through injection wells. Additional advantages of this method of disposal are that ground subsidence which might otherwise be caused by depletion of underground geothermal reservoirs is eliminated, and useful life of the underground reservoirs are usually increased.

Although reinjection often provides the only feasible method for disposing of geothermal effluent, serious problems, usually related to high silica content of the geothermal liquid, are nevertheless associated with such disposal. As mentioned, in many locations, the hot pressurized geothermal liquid, as extracted, is saturated with silica. When the geothermal liquid is flashed to extract steam for power production, the pressure of the liquid is reduced and the liquid becomes supersaturated with silica. As a result, silica rapidly precipitates from the liquid to form a hard scale on downstream piping and injection equipment, including the injection wells themselves. With many geothermal aqueous liquids, a silica scale formation rate of several inches per month is not unusual. As scaling of the piping, equipment and injection wells builds up, the geothermal liquid flow through the system becomes choked off and facility shutdown is then necessary for system reconditioning, which may include costly reboring of the injection wells. Because the silica scale is ordinarily very hard and tough, and clings tenaciously to equipment, the renovation process is difficult, time-consuming and costly, both in terms of actual renovation costs and in terms of nonproductive facility downtime.

Two general methods are typically used to minimize the silica scaling problems in geothermal liquid power producing facilities. One method is to treat or handle the geothermal liquid in such a manner as to keep the silica in solution through reinjection. The other method is to cause sufficient silica precipitation from the geothermal liquid, in a controlled manner and in specific facility stages from which the precipitated silica can be easily removed, to keep the silica level below saturation during the reinjection stage.

As can be appreciated, when the geothermal aqueous liquid is saturated with silica at wellhead temperatures and pressures, it is very difficult to keep the silica in solution when the liquid temperature and pressure is substantially reduced during the energy extraction process. The silica scale preventing method of controlled removal of sufficient silica so that the silica saturation level is not exceeded during the energy extraction process, although not without problems, may, therefore, be preferred in many instances where silica scaling would otherwise be a problem.

One of the greatest difficulties with silica removal processes is the removal of the right amount of silica at the right stage in the system. If an insufficient amount of silica is removed, silica scaling will not be prevented and if the silica is not precipitated where intended, the precipitate may carry over into other stages of the system and cause flow restriction problems. On the other hand, excessive removal of silica may overload the silica disposal stages and add to the silica waste disposal costs. Therefore, to assure a practical and relatively trouble-free system, the silica removal process must be carefully controlled.

With respect to the silica removal process, seeding of the geothermal aqueous liquid with a seed material, onto which the silica in solution crystallizes, appears to offer advantages of rapid, and hence location-controlled, silica removal. Such seeding processes typically pump some of the silica precipitate removed from one stage of the system into the flow of geothermal aqueous liquid at an upstream point, typically a flash-crystallizing stage which may be comprised of one or more flash-crystallization vessels. As the flashed geothermal liquid is contacted with the silica seed material in the flash crystallization stage, silica crystallizes from the liquid onto the seed material; the resulting precipitate is then removed, for example, in a downstream reactor-clarifier stage.

Problems have heretofore, however, been associated with disposing of the large flow of high pH steam condensate which results from using the steam extracted from the geothermal aqueous liquid. Typically the flow of condensate is about 10 percent of the flow of flashed geothermal liquid and may accordingly be as great as several hundred thousands pounds per hour. Although the steam extracted from the geothermal aqueous liquid by the flashing process is generally much less contaminated than the geothermal liquid, it usually has enough contaminants, notably boron and arsenic, which are carried over into the steam to cause the steam condensate to be unusable and, as in the case of geothermal liquid, the most practical disposal method for the condensate is reinjection. Therefore, the basic steam condensate is ordinarily recombined with the acidic, flashed geothermal liquid upstream of the injection stage.

Applicants have, however, discovered that because of the substantial differences in the chemical composition and also the pHs of the steam condensate and the flashed geothermal aqueous liquid, combining of the steam condensate with the flashed geothermal liquid upsets the chemical equilibrium in the liquid, thereby disrupting the silica crystallization process. Moreover, applicants have found that such recombination also causes the formation of fine particulate matter, for example, heavy metal sulfides, carbonates, and/or hydroxides, which remains in suspension and subsequently cloggs up media filters through which the combined geothermal liquid and steam condensate are passed before reinjection. Still further, equipment scaling has been discovered by applicants to occur in regions of condensate-flashed liquid recombination.

It is, therefore, an object of the present invention to provide a method for combining high pH steam condensate with an acidic, flashed, silica-rich geothermal aqueous liquid in a silica precipitating-type of system so as to prevent the formation of unwanted, suspended particulate matter.

Another object of the present invention is to provide a method for combining high pH steam condensate, within a silica removal stage, with flashed, silica-rich geothermal aqueous liquid, which includes adjusting the pH of the steam condensate so as to prevent the formation of undesirable, suspended particulate matter.

A further object of the present invention is to provide a method of combining, in a silica crystallization stage, a flow of high pH steam condensate with a flow of acidic, silica-rich, geothermal aqueous liquid, in which the pH of the steam condensate is adjusted so as to optimize the silica precipitation in the silica crystallization stage.

A still further object of the present invention is to provide a method for combining a flow of high pH steam condensate with a flow of hot, acidic geothermal aqueous liquid containing heavy metals in solution, which prevents the formation of suspended heavy metal compounds.

Still another object of the present invention is to provide a method for combining a flow of high pH steam condensate with a flow of hot, acidic geothermal aqueous liquid in which at least part of the steam condensate is used as a pump seal purge for pumps used in the system.

Additional objects, advantages and features of the invention will become apparent to those skilled in the art from the following description, when taken in conjunction with the accompanying drawing.

SUMMARY OF THE INVENTION

In accordance with the present invention, a method is provided for combining condensate of geothermally derived steam with a flow of geothermal liquid containing water and impurities, the geothermal liquid having an acidic pH, the condensate having a basic pH and containing water and impurities, the geothermal liquid and condensate being such that, if combined without treatment, suspended particulate matter would form in the resultant mixture, the method comprising the reducing of the formation of the suspended particulate matter by treating the flow of steam condensate so as to reduce the pH thereof to a level of no more than about 7 and preferably to a level of between about 7 and about 5.5.

The flow of reduced pH steam condensate is then outgassed so as to reduce the content of volatile impurities which, when the condensate and geothermal liquid are combined, would cause the formation of the suspended particulate matter. The outgassed condensate is then combined with the flow of geothermal liquid upstream of an injection stage which injects the combined flow of condensate and geothermal liquid into the ground.

As a result, the formation of suspended particulate matter, which could otherwise cause clogging of such geothermal treating equipment as media filters, is substantially prevented, as is localized scaling of equipment in the region of condensate-geothermal liquid combination.

Treating of the flow of steam condensate preferably comprises contacting the condensate with an acidifying agent. More preferably, the acidifying agent is selected from the group consisting of hydrochloric acid, acetic acid and acetic acid derivatives. Most preferably, the acidifying agent used is hydrochloric acid because of its good condensate acidifying characteristics, ready availability and relatively low cost.

Typically the steam condensate contains appreciable levels of hydrogen sulfide, hydroxides (such as ammonium hydroxide) and carbonates, which are suppressed or maintained in solution by the normally high pH (about 9) of the condensate until the condensate (absent treatment according to the present invention) is combined with the normally acidic (pH of about 5-5.5) geothermal liquid (or brine). Upon combination those named impurities in the condensate combine with heavy metal, calcium and iron impurities in the geothermal liquid to form heavy metal sulfides, calcium carbonate and ferrous hydroxide, in the form of particles which are too fine to precipitate out in silica removal processes of the seeding type used in the system. Preferably, after its pH is reduced, the steam condensate is flowed through a tank which is open to the atmosphere, so that carbon dioxide and hydrogen sulfide is outgassed.

In an exemplary geothermal liquid system, silica is removed in a flash crystallization stage in which silica-rich geothermal liquid is flashed to extract steam therefrom, and in which silica seed material is introduced, silica crystallizing out of solution in the geothermal liquid onto the seed material for removal from the system. According to the present invention, the flow of outgassed steam condensate is combined with the flashed geothermal liquid in such flash-crystallization stage of the system.

Also, according to the present invention, some of the outgassed steam condensate may be diverted to various of the fluid pumps used in the system for purging the pump seals, the steam condensate so used being thereby combined in the pumps with geothermal liquid being pumped thereby.

Since silica particle size in the seed crystallization process is also affected by pH of the steam condensate, within the adjusted pH range of steam condensate which is preferred (that is, between about 7 and about 5.5) the present method may also provide for adjusting the pH level in response to monitoring the mean size of particles produced in the flash-crystallization stage. The steam condensate pH is lowered, by increased acidification thereof, to increase the mean particle size and is maintained at, or increased, by reduced acidization to decrease mean particle size. Preferably, the steam condensate pH is adjusted to provide a mean particle size of between about 9 and 15 microns. The present method therefore also enables "fine tuning" of the silica removal process.

BRIEF DESCRIPTION OF THE DRAWING

The present invention will be more readily understood by reference to the accompanying drawing which depicts an exemplary hot geothermal brine power generating facility or system in which the present steam condensate treating method may be used to advantage, FIG. 1A showing a part of the system and
FIG. 1B showing the rest of the system.

DESCRIPTION OF THE PREFERRED EMBODIMENT

Figure 1A:
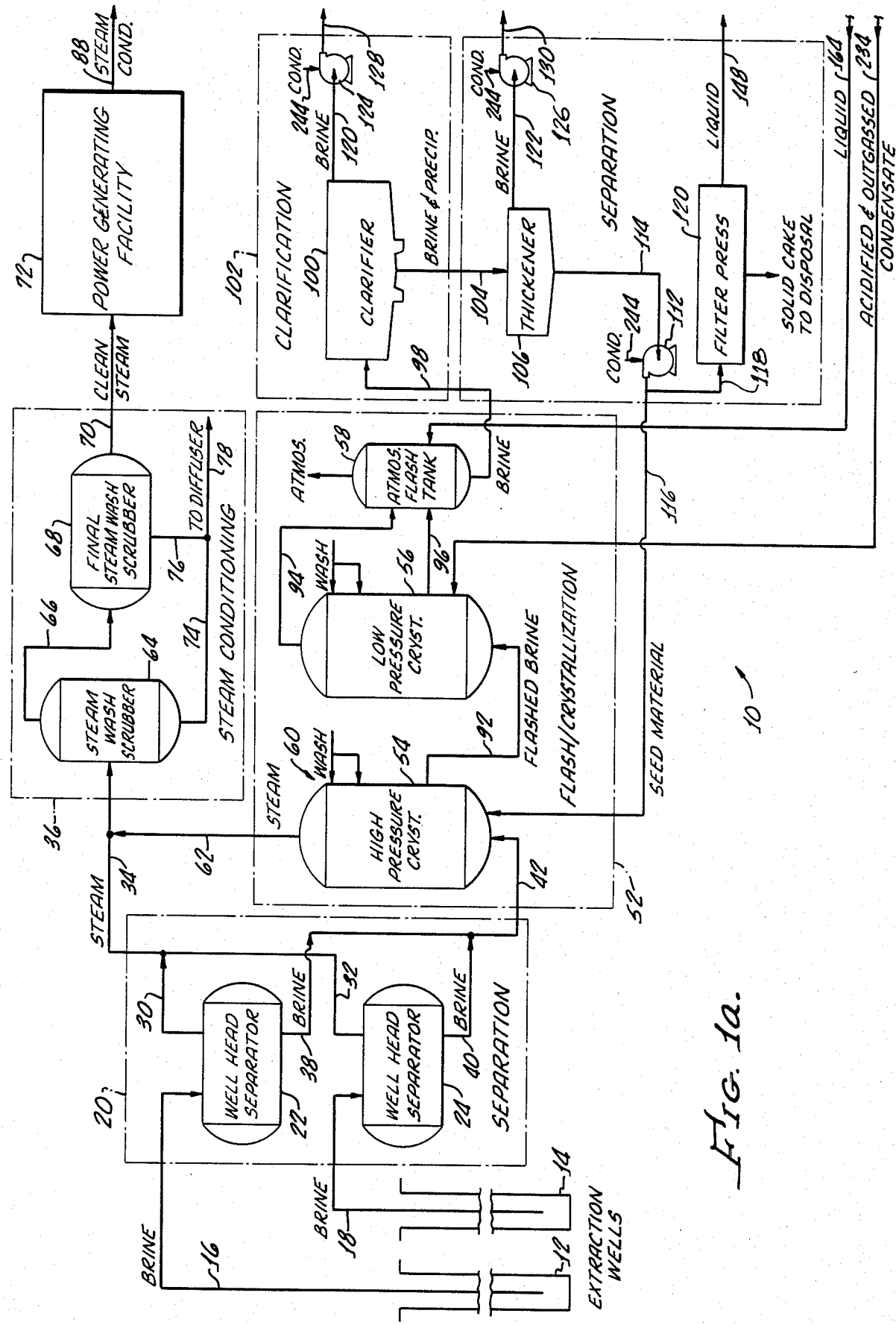

The present steam condensate treatment method is especially directed toward the acidification and outgassing of a flow of condensate of steam extracted in a hot geothermal brine power generating facility or system, and the subsequent combining of the acidized steam condensate with the geothermal brine for reinjection of the combined liquids into the earth through injection wells. As more particularly described below, the method is particularly adapted for use in a system in which a seed crystallization process is used to induce controlled precipitation of silica from silica-rich brine after steam, used for power generation, is flashed from the brine. Such controlled silica precipitation and removal is intended to greatly reduce or substantially eliminate silica scaling in system piping, equipment and injection wells.

An exemplary hot geothermal aqueous liquid (for example, brine) electric power generating facility or system 10, in which the present method is practiced, is depicted in the drawing, a description of system 10 being helpful to an understanding of the method.

Hot, pressurized geothermal aqueous liquid, hereinafter, for convenience, referred to as brine, is provided to system 10 from first and second extraction wells 12 and 14 respectively. It is to be appreciated that although only two wells 12 and 14 have been depicted in the Figure, a number of other wells may also be used to provide, for example, a total brine flow of about 1.2 million pounds per hour for a 10 megawatt power output from system 10. At the wellhead, geothermal brine may have a temperature of about 500° F. and a natural pressure of about 450 p.s.i.g.

From wells 12 and 14, the extracted brine, which typically contains rubble, including sand and rock, is fed through respective conduits 16 and 18 to a separation stage 20. Included in separation stage 20 are first and second wellhead separation vessels 22 and 24, to which conduits 16 and 18 are respectively connected. Within separation vessels 22 and 24 some dissolved steam escapes from the brine, being fed by respective separate conduits 30 and 32 to a common conduit 34 which, in turn, feeds the steam to a steam conditioning stage 36, described below.

Brine is discharged from separators 22 and 24 through respective conduits 38 and 40 to a common brine conduit 42 which, in turn, feeds the brine to a flash crystallization stage 52.

Comprising flash crystallization stage 52 are high pressure flash crystallizer 54, low pressure crystallizer 56 and atmosphere flash tank 58. Brine conduit 42 feeds high temperature, high pressure geothermal brine into the bottom of high pressure crystallizer 54 which is operated at a pressure of about 100 p.s.i.g. so as to enable flashing of dissolved steam from the brine.

Within crystallizer 54, steam washing means 60 are provided for washing the extracted steam before the steam is fed through a steam conduit 62 to combine with separator steam in conduit 34.

Although steam from separating stage 20 and flash crystallizer 54 is relatively low in impurities as compared with the geothermal brine, a number of dissolved impurities are carried along in the flow of steam. These include, for example, ammonia, (in the form of ammonium hydroxide) carbon dioxide (in the form of carbonates), and hydrogen sulfide. Amounts of such other contaminants, notably boron, are also typically carried over from the brine into the flow of steam.

Within steam conditioning stage 36, steam is fed through conduit 34 into a preliminary steam wash scrubber 64. Steam from scrubber 64 is then fed by a conduit 66 to a final wash scrubber 68. Washed steam from final scrubber 68 is flowed through conduit 70 to a power generating facility 72 in which the flow of steam is used to generate electric power by generally conventional steam turbine-electric generator apparatus (not shown). Water from scrubbers 64 and 68 is fed through conduits 74 and 76, respectively, to a common discharge conduit 78 through which the water is fed to a diffuser sump 80 for subsequent disposal, as described below.

Within power generating facility 72, energy is extracted from the steam flow from conduit 70 so that the steam condenses. The flow of steam condensate, which may, for a total brine extraction rate of about 1.2 million pounds per hour, be about 155,000 pounds per hour, is discharged through a condensate conduit 88 to a condensate treatment stage 90, described below. As above-mentioned, the steam condensate is ordinarily too contaminated, with such materials as boron, to be usable and the most practical disposal is by reinjection into the ground with the "used" (flashed) geothermal brine.

Within flash crystallizing stage 52, flashed brine from high pressure flash crystallizer 54 is fed through a conduit 92, to low pressure flash crystallizer 56, which may be maintained at a pressure between atmospheric and about 30 p.s.i.g. Some additional steam is flashed from the brine in low pressure flash crystallizer 56. As shown in the drawing, the steam extracted in crystallizer 56 is fed through a conduit 94 to atmospheric flash tank 58 from which it is discharged into the atmosphere. It is to be appreciated, however, that the steam from low pressure flash crystallizer contains substantial energy and so may be used for such purposes as additional power generation in a binary fluid system (not shown), for heating or for other energy-related purposes. In such cases, additional steam condensate, requiring disposal in the manner described herein, would be formed.

Brine and silica precipitate from crystallizer 56 is flowed through a conduit 96 to atmospheric flash tank 58, and from such tank, through a conduit 98, to a large clarifier vessel 100 which forms part of a clarification/separation stage 102.

Silica precipitate, formed in flash crystallizers 54 and 56 and continuing to form in clarifier 100, is separated from the geothermal brine in the clarifier, the wet precipitate being discharged from the bottom of the clarifier via a conduit 104. The wet silica precipitate, which also contains impurities such as lead, zinc, arsenic and other metals carried along with the precipitating silica, is flowed through conduit 104 to a thickener vessel 106 which also forms part of clarification and separation stage 102.

Silica seed material for the silica crystallization process in flash crystallization stage 52 is withdrawn by a pump 112, through a conduit 114, from the bottom of thickener vessel 106. Pump 112 feeds the seed material through a conduit 116 to high pressure flash crystallizer 54 in which a counterflow of seed material and geothermal brine enhances silica crystallization from the brine onto the seed material.

A major portion of the silica precipitate discharged from thickener vessel 106 is fed (controlled by valves, not shown) by pump 112 through a conduit 118 into a filter press 120. Solid cake precipitate is removed from filter press 120 for disposal.

Clarified geothermal brine is discharged from clarifier 100 and thickener vessel 106 through brine conduits 120 and 122, respectively, to respective brine pumps 124 and 126. Such pumps 124 and 126 pump the brine, through conduits 128 and 130, respectively, to a common conduits 132 and 134, which discharge into first and second media filters 136 and 138. Filter bypass conduits 140 and 142, connected respectively to brine conduits 132 and 134, enable bypassing of media filters 136 and 138 (by use of valves, not shown). Bypass conduits 140 and 142 are connected to a common conduit 144 which discharges brine into a settling basin 146. Brine from filter press 120 is also fed, through a conduit 148, to settling basin 146. From settling basin 146, brine is recycled, by a pump 160, through conduits 162 and 164 back to atmospheric flash tank 58.

Clarified brine is discharged from media filters 136 and 138 through respective conduits 166 and 168 to a common conduit 170 which is, in turn, connected to an injection pump 172. A conduit 174 is connected between conduit 170 and a backwash holding tank 176.

A pump 180, connected to holding tank 176 by a conduit 182, enables the pumping of filtered brine, through conduits 184, 186 and 188, to media discharge conduits 166 and 168, to enable back flashing of media filters 136 and 138. Flow of brine for such purpose is controlled by various valves, not shown.

An additional pump 196, connected to holding tank 176 by a conduit 198, is provided for recirculating, by a conduit 200, filtered brine back through media filters 136 and 138.

Filters 136 and 138, holding tank 176, pumps 160, 180, and 196, diffusion sump 80 and settling basin 146 form a filtration and settling stage 202.

Filtered brine is pumped by injection pump 172 through conduits 204, 206, and 208, into first and second injection wells 210 and 212 respectively, such wells and pump forming an injection stage 214.

In condensate treatment stage 90, an acidifying agent is fed by a pump 216, through conduits 218 and 220 from a storage tank 222, into steam condensate conduit 88 upstream of where the conduit discharges into an open receiving tank 224. A mixer (not shown) may be installed in conduit 88 to mix the acidifying agent and condensate. Tank 224 overflows into an open condensate storage tank 226 which, in turn, overflows into an open condensate supply tank 228.

Treated condensate is pumped, by a condensate pump 230, through conduits 232 and 234, from condensate supply tank 228 into low pressure flash crystallizer 56 for combination therein with the flashed geothermal brine.

A second condensate pump 240 is connected, by conduits 242, and 244, for pumping a small amount, for example, about 200 pounds per hour, of the treated condensate from condensate supply tank 228 to purge the seals of pumps 112, 124, 126, 160, 172, 180, 196, 216, 230, and 240 for cooling the pump seals and flushing the seals to prevent solid particles, which may be in the pumped liquid, from damaging seal-to-pump sealing surfaces. Condensate pumped by pump 240 to the various mentioned pumps flows through the seals and combines with the liquid being pumped.

Pumps 216, 230 and 240, acidifying agent storage tank 222 and tanks 224, 226 and 228 comprise steam condensate treatment stage 90. An emergency overflow tank 246 is disposed between settling basin 146 and condensate supply tank 228, the overflow tank forming, as shown, part of both filtration and settling stage 202 and condensate treatment stage 90.

Steam condensate entering condensate treatment stage 90 may typically have a basic pH of about 9 or 10 and may be at a temperature of about 120° F. As above mentioned, the condensate has a number of impurities including ammonia (ammonium hydroxide), carbon dioxide (carbonates) and hydrogen sulfide.

As was also mentioned above, the flashed brine may have relatively high levels of heavy (including transition) metals, iron and calcium. As a result, when untreated steam condensate is combined with the flashed brine for reinjection therewith, by injection stage 214, insoluble compounds, including, for example, heavy metal sulfides, calcium carbonate and ferrous hydroxide, are formed between impurities in the condensate and brine. These insoluble materials tend to be very small, for instance, typically less than about 0.5 microns in diameter and therefore tend to remain in suspension (that is, are non-precipitating).

Because the flow of steam condensate from power generating facility 72 is quite appreciable and because of substantial differences in the chemical composition of the condensate and the geothermal brine, it is advantageous to combine the condensate with the brine as far upstream of clarifier 100 and injection stage 214 as possible. Thus, as described above, the condensate from supply tank 228 is pumped (by pump 230 through conduit 234) to low pressure crystallizer 56, so as to enable thorough combining with the brine before the combined flow reaches clarifier stage 102 in which the silica precipitate is removed from the flow.

As also discussed above, the steam condensate may have a relatively high pH of about 9 or 10, as is caused by ammonia carried over into the steam when the steam is flashed from the brine. At this basic pH, the ammonia in the condensate reacts with hydrogen sulfide and carbon dioxide, also carried over from the geothermal brine, in a manner inhibiting out gassing of these contaminates. The relevant chemical reactions believed to be involved, at a condensate pH of about 9, are as follows:

$$NH_3 + H_2SO \rightarrow NH_4HS$$

$$NH_3 + CO_2 + H_2O \rightarrow NH_4HCO_3$$

$$NH_3 \text{ (gas)} \rightleftharpoons NH_3 \text{ (dissolved)}$$

Unless otherwise treated, the condensate with these chemical characteristics combines with geothermal brine having dissolved heavy metal, iron and calcium contaminates, to form heavy metal sulfides, calcium carbonate and iron hydroxide. These compounds are in the form of particles which are too small in size to precipitate out in clarifier 100 and therefore pass through the clarifier into media filters 136 and 138 in which many are filtered out of the flow. These fine materials have been found to be formed at sufficient rates to cause substantial problems with clogging of media filters 136 and 138 and also injection wells 210 and 212.

It has also been found that, when the untreated condensate is combined with the flashed brine in low pressure crystallizer 56, lead hydroxychloride (PbOHCl) is also formed as a result of reactions between impurities in the condensate and brine. Lead hydroxychloride, which is also in the form of fine particulate matter has been found to be very corrosive to steel equipment used in system 10.

It has been found that by acidifying the condensate so as to reduce its pH to at least about a neutral condition (pH of about 7), the hydrogen sulfide and carbon dioxide are released for outgassing and that ammonia is fixed in solution. The chemical reactions involved are believed (for a condensate pH of about 7 or less) to be as follows:

$$NH_4HS + H^+ \rightarrow NH_4^+ + H_2S \uparrow$$

$$NH_4HCO_3 + H^+ \rightarrow NH_4^+ + CO_2 \uparrow + H_2O$$

$$NH_3 \text{(gas)} + H^+ \rightarrow NH_4^+$$

Acidifying the condensate also inhibits formation of lead hydroxychloride.

It has been determined that for sufficient outgassing of the above-mentioned impurities from the steam condensate to substantially prevent formation of the fine, non-precipitating sulfide, carbonates and hydroxides when the outgassed steam condensate is combined with the geothermal brine in low pressure crystallizer 56, pH of the condensate should be reduced at least to about 7, (the neutral condition) and may be further reduced to about the pH of the brine.

Moreover, pH of the outgassed steam condensate as it combines with the brine in crystallizer 56 has been found to affect the silica crystallizing processes in flash crystallization stage 52. As previously discussed, the amount of silica removed from the geothermal brine is ideally just that amount which prevents any substantial scaling of downstream equipment. Size of the silica precipitate particles formed in the flash crystallization stage 52 is important to amount and rate of silica removed. As particle sizes increase, less surface area per precipitate volume is provided. Since in the silica removal process silica crystallization from the flashed geothermal brine onto seed particles depends upon surface area of the particles, the formation of large particles inhibits the silica removal process. On the other hand, if the particles formed are too small, precipitation thereof may not occur and the particles may be carried over into, and cause clogging of, media filters 136 and 186.

As a result, it has been found possible to "fine tune" the silica crystallization process in crystallization stage 52 by adjusting the acidizing of the steam condensate while maintaining the condensate pH between about 7 and about 5.5 (the appropriate pH of the flashed brine). Such fine tuning of the silica crystallization process may, for example, be important to accommodate fluctuations over time in brine characteristics.

Monitoring of the size of particles flowing with the geothermal brine into clarifier 100, therefore, provide means for determining the extent to which the steam condensate should, within the above-expressed approximate limits, be acidified. It is found, for a particular exemplary brine, that mean particle size of clarifier 100 is preferably between about 9 and about 15 microns for good silica crystallization, and acidification of the steam condensate is adjusted so as to maintain such a mean particle size. If the mean particle size falls below the preferred range, acidifying of the condensate is increased and if the mean particle size increases appreciably over the desired range, the acidifying of the condensate is decreased.

An additional advantage of acidifying the steam condensate in the described manner is that scaling, which has ordinarily been found to occur on piping and equipment in the region of condensate-brine recombination, has been found to be eliminated or substantially reduced.

According to a preferred embodiment, pH of the steam condensate is reduced by the addition of an acidifying agent provided by pump 216, through conduits 218 and 220 from storage tank 222. Preferably the acidifying agent is hydrochloric acid because of its low cost, ready availability and effectiveness in reducing condensate pH. Other acids, such as acetic acid or acetic acid derivatives, can alternatively be used. Use of sulphuric acid to acidize the steam condensate has been found to cause formation of additional solids and use of nitric acid has been found to cause corrosion problems in the system; hence, use of these acids is not preferred.

The present invention may be further described with reference to the following example:

EXAMPLE

Geothermal brine is extracted from the equivalent of extraction wells 12 and 14 at a rate of about 1.2 million pounds per hour, the steam extracted therefrom being used to generate about 10 megawatts of power. Steam condensate is formed at the rate of approximately 155 thousand pounds per hour. At the wellhead, the geothermal brine has a temperature of about 500° F. and a pressure of about 450 p.s.i.g.

Composition of the geothermal brine at the point of condensation combination mixing therewith in low pressure crystallizer 56 is approximately as follows:

Sodium—60,000 parts per million (PPM)
Potassium: 15,000 PPM
Calcium: 30,000 PPM
Iron (Ferrous): 800 PPM
Manganese: 900 PPM
Zinc: 350 PPM
Lead: 100 PPM
Chloride: 170,000 PPM
Silica: 350–500 PPM Temperature of the brine at the mixing point is about 300°–325° F. and the pressure in crystallizer 56 is about 30 p.s.i.g.

Composition of the steam condensate prior to upstream of the condensate acidifying point is approximately as follows:

Boron: 7 PPM
Chloride: 15 PPM
Carbonates: 420 PPM
Ammonia: 259 PPM
Hydrogen Sulfide: 35 PPM
Total Dissolved Solids: 60 PPM Temperature of the condensate is about 120° and the pH is about 9.3.

Sizes of particles formed by recombination of unacidized steam condensate with the brine are as follows:

Lead, zinc and iron sulfides <0.5 microns
Calcium carbonate—2–4 microns
Ferrous hydroxide—<2 microns and mean particle size in clarifier 100 is about 2–3 microns.

Between about 10 and about 14 gallons per hour of 31 weight percent of hydrochloric acid are added to the steam condensate by pump 216, the pH of the condensate being thereby reduced to about 6.9. The acidified steam condensate is flowed into and through an open concrete tank (corresponding to tanks 224, 226 and 228 combined) which is approximately 6 feet wide, 10 feet deep and 60 feet long, average condensate residence time in the tank being about 15 minutes, so as to allow time for hydrogen sulfide and carbon dioxide outgassing.

Composition of the acidized and outgassed condensate is approximately as follows:

Boron: 7 PPM
Chloride: 460 PPM (due to HCl added)
Bicarbonate: 240 PPM
Ammonia: 259 PPM
Hydrogen Sulfide: <1 PPM
Sulfate: 20 PPM (Produced by oxidation of $H_2S$ during outgassing)

Mean particle size in clarifier 100 is then found to be between about 9 and about 14 microns.

Duration of the steam condensate acidifying test is about three months.

Although a particular embodiment of the invention has been described, it will, of course, be understood that the invention is not limited thereto, since many obvious modifications can be made, and it is intended to include within this invention any such modifications as fall within the scope of the claims.

Having now described the invention, we claim:

1. A method of combining condensate of geothermally derived steam with a flow of geothermal liquid containing water and impurities, said geothermal liquid having an acidic pH, said condensate having a basic pH and containing water and volatile impurities, the impurities in said geothermal liquid and said condensate being such that, if the liquid and condensate are combined without treatment, suspended particulate matter would form in the mixture as a result of reaction between said geothermal liquid impurities and said condensate volatile impurities, said method comprising the reducing of the formation of said suspended particulate matter by the steps of:

(a) treating the steam condensate to reduce the pH thereof to no more than about 7;

(b) outgassing the condensate of reduced pH to reduce the concentration of volatile impurities which, when the condensate and geothermal liquid are combined react with the impurities in the geothermal liquid to cause the formation of said suspended particulate matter, the amount of said particulate matter being thereby reduced; and (c) combining the outgassed condensate with the flow of geothermal liquid.

2. A method of combining condensate of geothermally derived steam with a flow of geothermal liquid, comprising water and impurities, the condensate volatile impurities and having a basic pH, whereas the geothermal liquid has an acidic pH, said method comprising the steps of:

(a) treating the steam condensate to reduce the pH thereof to no more than about 7;

(b) outgassing the reduced pH steam condensate, to thereby reduce the concentration levels of said volatile impurities which react with impurities in the geothermal liquid to form suspended particulate matter, so as to reduce the formation of said matter when the condensate is combined with the geothermal liquid; and, (c) combining the outgassed steam condensate with the flow of geothermal liquid.

3. The method as claimed in claims 1 or 2 wherein the step of treating the flow of steam condensate to reduce the pH thereof comprises contacting the flow of steam condensate with an acidifying agent.

4. The method as claimed in claim 3 wherein the step of contacting the flow of steam condensate with an acidifying agent includes mixing with the flow of steam condensate an acid selected form the group consisting of hydrochloric acid, acetic acid, and acetic acid derivatives.

5. The method as claimed in claims 1 or 2 wherein the step of outgassing the condensate includes flowing the reduced pH steam condensate through a tank which is open to the atmosphere.

6. The method as claimed in claims 1 or 2, wherein the impurities in said geothermal liquid includes silica, wherein said steam is extracted from said geothermal liquid in a flash crystallization stage in which the flow of geothermal liquid is contacted with particulate seed material for causing the crystallization of silica from the geothermal liquid onto said seed material, and wherein the step of combining the outgassed steam condensate with the flow of geothermal liquid includes combining the outgassed steam condensate into the flow of geothermal aqueous liquid in said flash crystallization state.

7. The method as claimed in claims 1 or 2 wherein the step of combining the steam condensate with the flow of geothermal liquid includes flowing at least some of the outgassed condensate through seal regions of pumps used to pump said liquid to thereby cool and flush said seal regions.

8. A method of combining condensate of geothermally derived steam with a flow of geothermal liquid, comprising water and impurities, from which said geothermal steam is extracted, said condensate having impurities including ammonia, hydrogen sulfide and carbonates and having a basic pH, said geothermal liquid having impurities including heavy metals, iron, calcium and silica and having an acid pH, said method comprising the steps of:

(a) contacting the steam condensate with an acidifying agent so as to reduce the pH of said condensate to a level of between about 7 and about 5.5;

(b) outgassing the reduced pH condensate to reduce the concentration levels of hydrogen sulfide and carbon dioxide to thereby reduce the amount of suspended particulate matter formed when the condensate is combined with the flow of geothermal liquid by the reacting of ammonia, hydrogen sulfide and carbonates in the condensate with heavy metals, calcium and iron in the geothermal liquid to form heavy metal sulfides, calcium carbonate and iron hydroxide, said ammonia being fixed in said condensate by the reduction of pH therein; and, (c) combining the outgassed steam condensate with the flow of geothermal liquid in a flash crystallization stage in which steam is extracted from said geothermal liquid and in which said geothermal liquid is contacted with seed material to cause removal of silica from said liquid.

9. The method as claimed in claim 8 wherein the geothermal liquid and the steam are used in a geothermal power generating system employing a plurality of liquid pumps, including the step of flowing part of the outgassed steam condensate to at least some of said pumps for the purging of seals thereof, the steam condensate so used being combined in the pumps with liquid being pumped therethrough.

10. The method as claimed in claim 8 wherein the step of contacting the steam condensate with an acidifying agent includes mixing with said steam condensate an acid selected from the group consisting of hydrochloric acid, acetic acid and acetic acid derivatives.

11. The method as claimed in claim 8 including the step of measuring the size of silica particles formed by the silica seeding process and wherein the step of contacting the steam condensate with an acidifying agent includes adjusting the amount of acidifying agent used within the condensate pH range of between about 7 and about 5.5 as required to maintain the mean size of said silica particles within a predetermined range.

12. The method as claimed in claim 11 wherein said preselected particle size range is between about 9 and about 15 microns.

13. A method of combining condensate of geothermally derived steam with a flow of silica-rich, acidic geothermal brine from which the steam is extracted by flashing the brine, said brine containing impurities in solution, said condensate having impurities carried over from the brine in the flashing process, and having a basic pH, said method comprising the steps of:

(a) adding an amount of acidifying agent to the flow of condensate causing the pH thereof to be reduced to a level of between about 7 and about the pH level of the geothermal brine with which the condensate is being combined;

(b) outgassing the reduced pH steam condensate to reduce the level of volatile impurities which react with impurities in the geothermal brine to form suspended particulate matter;

(c) combining the outgassed steam condensate with the geothermal brine in a flash crystallization stage in which the flow of flashed brine is contacted with seed material onto which silica from the brine is crystallized to form a precipitate; and, (d) monitoring the size of particles in said precipitate and adjusting the amount of acidifying agent added to the steam condensate so as to maintain the mean size of said particles within a preselected range.

14. The method as claimed in claim 13, wherein said preselected range of mean particle size has a lower level of about 9 microns.

15. The method as claimed in claim 13 wherein the steam condensate is acidified to a pH level of between about 7 and about 5.5.

16. The method as claimed in claim 13 wherein the acidifying agent is an acid selected from the group consisting of hydrochloric acid, acetic acid and acetic acid derivatives.

17. The method as claimed in claim 14 wherein the acid selected is hydrochloric acid.

18. The method as claimed in claim 13 wherein the preselected mean particle size is between about 9 and about 15 microns.

19. The method as claimed in claim 13 wherein the geothermal brine is used in a geothermal brine power generating system having a plurality of pumps for pumping the brine from one stage to another stage, including the step of flowing at least some of the outgassed steam condensate to seals of at least some of said pumps for cooling said seals and for flushing the pump seals to prevent damage by particulate matter in the brine being pumped, said condensate flowing through said seals and being combined with the brine being pumped therethrough, scaling in the pumps being also thereby inhibited.

20. The method as claimed in claim 13 wherein the step of outgassing the acidified steam condensate includes flowing the acidified condensate through a tank which is open to the atmosphere, said open tank having a capacity permitting a preselected condensate residence time therein.

21. The method as claimed in claim 20, wherein said residence time is at least about fifteen minutes.

22. In a facility for producing steam from a flow of silica-rich, naturally pressurized geothermal brine having volatile impurities, including ammonia, hydrogen sulfide and carbon dioxide, and having non-volatile impurities, including heavy metals, iron and calcium, the facility having high and low pressure flash crystallizers in which some of the steam is converted to steam and in which the flashed brine is contacted with seed crystals onto which silica deposits from the brine as the flashed brine becomes supersaturated in silica, having a reactor-clarifier stage in which the deposited silica is separated from the brine, and having a filtering stage for filtering clarified brine discharged from the reactor-clarifier stage, a method for combining with the flashed brine condensate from said steam, the condensate being basic and containing some of said volatile impurities which tend to react with said non-volatile impurities in the flashed brine to form fine, insoluble particles which are difficult to separate from the brine in the reactor-clarifier stage, and which, therefore, flow with the brine into the filtering stage, the method of combining the condensate with the brine comprising:

(a) reducing the pH of the steam condensate to between about 7 and about 5.5 by contacting the condensate with an acidifying agent;

(b) permitting the reduced pH steam condensate to outgas so as to reduce the concentration levels of the volatile impurities, especially of hydrogen sulfide and carbon dioxide; and, (c) combining the reduced pH, outgassed steam condensate with the flashed brine in the low pressure flash crystallizer.

* * * * *

UNITED STATES PATENT AND TRADEMARK OFFICE
CERTIFICATE OF CORRECTION

PATENT NO. : 4,522,728
DATED : June 11, 1985
INVENTOR(S) : Darrell L. Gallup and John L. Featherstone It is certified that error appears in the above-identified patent and that said Letters Patent are hereby corrected as shown below:

The first word in the title is ACIDIFICATION.

Column 10, line 56, change "186" to -- 138 --.

Column 12, line 63, after "condensate" insert -- having --.

Column 13, line 48, change "acid" to -- acidic --.

Column 13, lines 66 and 67, change "crystallization" to -- crystallizing --.

Column 14, line 23, change "predetermined" to -- preselected --.

Signed and Sealed this

Twelfth Day of August 1986

[SEAL]

Attest:

DONALD J. QUIGG

Attesting Officer   Commissioner of Patents and Trademarks